UNITED STATES PATENT OFFICE.

JOHN C. GRAFT, OF NEWARK, NEW JERSEY.

PLASTIC COMPOUND.

SPECIFICATION forming part of Letters Patent No. 613,763, dated November 8, 1898.

Application filed October 26, 1897. Serial No. 656,391. (No specimens.)

*To all whom it may concern:*

Be it known that I, JOHN C. GRAFT, a citizen of the United States, residing at Newark, in the county of Essex and State of New Jersey, have invented certain new and useful Improvements in Plastic Compounds; and I do hereby declare the following to be a full, clear, and exact description of the invention, such as will enable others skilled in the art to which it appertains to make and use the same.

My invention relates to plastic compounds for modeling forms for molding and casting; and the invention consists in certain novel combinations of ingredients to form a plastic compound to be molded into forms to be used as dental base-plates of great strength, durability, and greater elasticity than base-plates as heretofore made.

My plastic compound is especially applicable to the modeling of artificial dentures in forming base-plates upon which to erect mineral teeth preliminary to the making of the mold in which the permanent vulcanized plates are formed.

The plastic compound is rolled into thin sheets of desirable thickness. A piece of the proper size is taken, slightly heated, and molded in the shape of the roof of the mouth. Ordinary wax is then arranged around the edge of the plate thus formed, and the plate is placed in the mouth and held by suction. When properly adjusted in the mouth, the person closes the jaws, and thus makes an impression of the teeth in the wax on said plate. This is used as a guide for the erection of the teeth preliminary to the making of the mold in which the permanent vulcanized plates of such artificial denture are formed.

My novel plastic compound is formed in the following manner: To two parts of gently-heated shellac I add one part of finely-pulverized French chalk and one part of fine rice-flour. These ingredients are then intimately mixed with the shellac by stirring and heated over a slow heat, causing the French chalk and the rice-flour to intermingle with the shellac until the parts become uniformly incorporated with each other, after which the mass is allowed to cool and finally rolled out into sheets, or it may be pressed into forms for immediate use. I also add to the above mixture of shellac, French chalk, and rice-flour a small part of beeswax, so as to modify the degree of stiffness and fusibility of the compound.

My plastic compound formed in this manner has great strength and stiffness and is adapted to become plastic at a low temperature to enable the compound to be readily molded into the form of the roof of the mouth to take the impression of the teeth, and it will retain such form at a temperature required for attaching the mineral teeth to the wax on the plate, so that it preserves its form for the modeling of the form of the gums to which the teeth are permanently attached.

I have produced a base-plate of great flexibility and one which is easily retained in the mouth, due to the suction produced.

Having thus described my invention, what I claim is—

The herein-described plastic compound, consisting of shellac with French chalk, rice-flour and beeswax, substantially as and for the purposes set forth.

In testimony that I claim the invention set forth above I have hereunto set my hand this 23d day of October, 1897.

JOHN C. GRAFT.

Witnesses:
    FREDK. C. FRAENTZEL,
    WM. H. CAMFIELD, Jr.